United States Patent Office 3,115,171
Patented Dec. 24, 1963

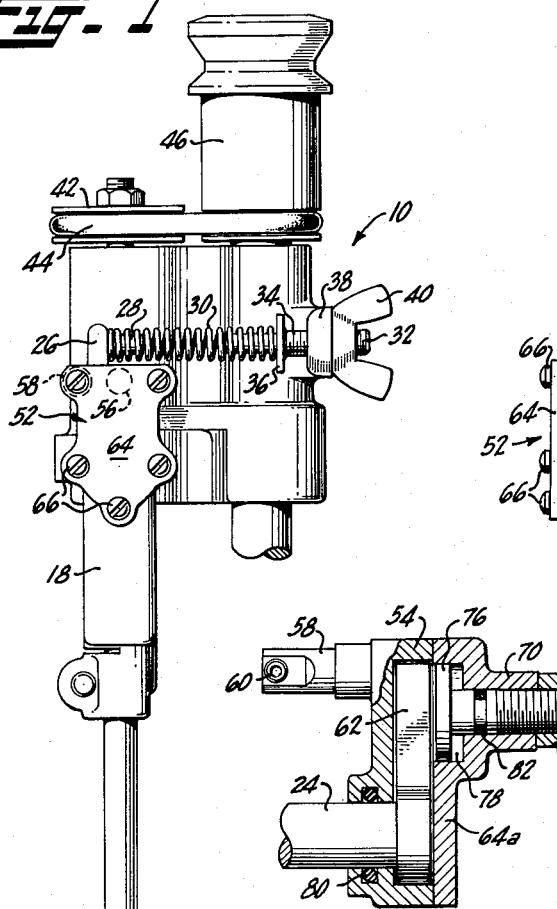

3,115,171
CUTTER MECHANISM FOR PEELING FRUIT
Malcolm W. Loveland, Orinda, Calif., assignor to Atlas Pacific Engineering Company, a corporation of California
Filed June 21, 1962, Ser. No. 204,164
4 Claims. (Cl. 146—43)

This invention relates to a cutter mechanism for peeling pears and the like and more particularly to a cutter mechanism which is provided with means for damping rapid oscillation of a cutter knife as the knife moves over the surface of fruit undergoing peeling.

Apparatus which have been available heretofore for peeling fruit such as pears tend to gouge relatively deeply into the flesh of the fruit at various points about the surface thereof while removing only the peel at other points or even skipping the peel completely in spots. This is because pears have a surface structure wherein adjacent alternate sections of the fruit are first relatively soft and then relatively firm, depending upon the location of the seeds beneath the pear surface, as well as a surface which may be very irregular.

When a spring is used to establish the position of the cutter relative to the pear surface, as is conventionally done, oscillation will be encountered, which oscillation is particularly pronounced if the structure of the cutter assembly is such that the oscillation caused by the texture or irregularity of the pear is of the same period as the natural period of the cutter assembly. Irrespective of the nature of the spring which is then used to urge the cutter into contact with the pear surface, the loss of fruit in the areas where the gouging occurs will be great and may, even where the knife is guarded to limit the depth of peeling, constitute as much as 5% of the total flesh remaining after the peeling operation. Also, the areas where the cutter has skipped the peeling require costly hand trimming.

A friction drag mechanism, as disclosed in co-pending application Serial No. 88,072, now Patent Number 3,058,- 502, for Rotary Knife Construction for Peeling Pears, is a partial solution but is less than ideal since it damps both slow movement of the knife and rapid oscillations, where it is desired, ideally, only to eliminate the latter.

It is therefore an object of this invention to provide a cutter mechanism for peeling fruit such as pears.

It is a further object of this invention to provide such a device wherein means are provided for discouraging deep gouging of the surface of the fruit being peeled as such fruit is rotated adjacent a peeling knife.

It is a further object of this invention to provide a structure of the type described above wherein a dash-pot is provided for limiting rapid oscillations of a pivotally-mounted cutter assembly while permitting relatively slow swinging of the cutter assembly whereby to permit the peeling knife to follow the surface of the fruit being peeled, irrespective of its diameter.

Other objects and advantages of this invention, if not specifically set forth, will become apparent during the course of the description which follows.

Generally, this invention relates to a mechanishm for peeling pears mounted for rotation adjacent said cutter mechanism wherein there is provided a supporting means for the cutter mechanism, a rotatable or stationary shaft having a knife secured thereto at one end thereof, means mounting said shaft to the supporting means at the end of the shaft opposite the knife, the supporting means permitting pivotal movement of the knife radially toward and away from the core of the fruit held adjacent the knife as the radius of the fruit undergoing peeling varies and, finally, means providing a drag on the movement of the shaft-mounting means whereby to oppose rapid oscillation of the knife relative to the surface of the fruit undergoing peeling, the means consisting of a dash-pot, one of the relatively moveable elements of which is secured directly or indirectly to the mounting means and one of the relatively moveable elements of which is secured directly or indirectly to the shaft upon which the knife is mounted.

In the drawings:

FIGURE 1 is a side elevation of the cutter assembly of this invention;

FIGURE 2 is a sectional view of the structure of FIGURE 1 but rotated 90° from the position shown in FIGURE 1;

FIGURE 3 is an enlarged perspective view of the dash-pot mechanism with the front plate removed whereby to disclose the interior and operation thereof; and FIGURE 4 is an enlarged sectional side elevation of a modified dash-pot mechanism incorporating means for varying the drag or reluctance to motion which can be provided by the dash-pot.

Referring now to the drawings wherein like characters refer to like parts throughout, there is shown a cutter mechanism similar to that of co-pending application Serial No. 88,072 for Rotary Knife Construction for Peeling Pears. The cutter mechanism shown may be directly substituted for that shown in this co-pending application. The apparatus consists essentially of a supporting means 10 which, as shown in the aforementioned co-pending patent application, is capable of being moved longitudinally of a pear or other fruit impaled on a coring tube, the pear being adjacent the knife 12 and with its stem and calyx axis normal to the plane of the paper, as shown in FIGURE 1. Shaft 14 supports the knife and turns within the fixed tube 16. The tube 16 is mounted in a Y-shaped yoke having a pair of arms 18 and 20. The yoke is pivoted to the supporting member 10 about pins 22 and 24, the latter of which will be discussed further hereinafter. The arm 18 of the yoke has an upstanding finger 26 in which is mounted a stud 28 which centers one end of helical spring 30. The spring bridges the space between the upstanding finger 26 and stud 32, which is threaded for a portion of its length in the area designated 34 and has a fixed flange 36 up against which the spring 30 rests. The stud 32 is threaded into a tapped hole in the arm 38 and wing nut 40 permits the stud 32 to be locked in place after the proper setting has been determined. This permits variation in the compression of the spring 30 and hence enables the pivoted knife 12 to bear with greater or lesser force upon the surface of the fruit to be peeled.

Other essential portions of the support mechanism are driven pulley 42 about which is trained rubber power transmission belt 44, in turn trained about drive pulley assembly 46. Each pulley is journaled for rotation. Pulley 42 drives flexible cable 47 which, through fitting 48, drives the shaft 14 upon which the cutter is mounted.

Set screws 50 and 51 fix the pins 22 and 24 against movement relative to the supporting structure 10. Pin 24 is a portion of the dash-pot 52 which includes a hollow chamber 54 which is permitted to move relative to the pin 24 against the resistance of a viscous fluid in accordance with familiar principles of dash-pot structure and operation. The vessel 54 is secured to the upstanding finger 26 of the left arm 18 (FIGURE 2) of the yoke by means of fingers 56 and 58, one of which fits on either side of the finger 26. Set screw 60 in finger 58 permits the finger 26 to be gripped tightly.

Pin 24 enters the chamber of the vessel at the lower end thereof and is provided with an upstanding wave 62 which extends essentially entirely to the opposite end of the chamber of the vessel but which is capable of sliding movement relative thereto. The width of the vane 62 is approximately that of the hollow chamber itself, with only a small amount of space between the walls (and at the upper end) being provided, depending upon the degree of damping desired. The remaining portion of the hollow vessel is filled with a viscous liquid, such as grease, so that as pin 24 is turned relative to the vessel 54, vane 62 will be forced to push the viscous liquid to one or the other side between the edges of the vane and the walls of the chamber, thus resisting and damping out fast oscillations while permitting slow, sustained movement of the vane 62 from one side to the other. Plate 64 covers the front of the vessel but has been removed in FIGURE 3 so as to permit scrutiny of the interior. The plate is held in place by means of screws 66.

Attention is directed to FIGURE 4 showing a structure similar to that of FIGURE 3 excepting that the face plate, here designated 64a, has an integral boss 70 tapped for receipt of threaded shaft 72. The threaded shaft has a locking nut 74 and on its innermost end beneath the face plate 64a supports block 76 which may be advanced away from or retracted back into the recess 78 in the face plate 64a. The innermost face of the block 76 thus may be moved closer or farther away from the vane 62, decreasing or increasing the space therebetween, thus to make more difficult or to facilitate the passage of fluid between these two elements. This in turn governs the amount of reluctance to relative motion between the vane 62 and the walls of the chamber of the dash-pot. Seals 80 and 82 prevent leakage of the fluid from the interior of the chamber.

In operation, power is transmitted through belt 44 to pulley 42, which in turn drives the flexible cable 47 and eventually the rotary knife 12. This is the preferred structure, though a stationary knife might be used with less satisfactory results. The pear, impaled upon a core tube positioned immediately adjacent the knife 12, is contacted by the knife as the knife and shaft 14 swing radially under the influence of helical spring 30. The pins 22 and 24 about which yoke arms 18 and 20 turn, together with spring 30, permit the knife to follow the exterior of the pear or other fruit as the diameter thereof varies, the fruit being moved relative to the knife or, as shown in aforementioned copending application Serial No. 88,072, the entire cutter assembly being moved longitudinally of the core tube. When such a fruit as a pear is being peeled, the alternate relatively soft and relatively firm portions or irregularities, described earlier, urge the knife and shaft to pivot rapidly about the pins 22 and 24 to the extent of a fraction of a degree, but this oscillation is minimized by the dash-pot 52. The entire vessel 54 is operatively connected to the arm 18 of the yoke by means of the fingers 56 and 58, so that as the cutter moves radially, grease within the chamber of the vessel must be forced to either side of the vane 62 as the vane, fixed to the pivot pin 24, moves relative to the chamber. Actually, installed as shown here, the vane is stationary and the chamber moves about the vane. Rapid oscillation of the knife relative to the surface of the pear undergoing peeling is thus damped and the knife tends to ride evenly on the exterior of any surface of reasonable regularity, irrespective of the presence of adjacent relatively soft and relatively hard sections. Relatively slower radial movements of the knife 12 and shaft 14, however, are not inhibited to any substantial extent as the two relatively moveable portions of the dash-pot, the pin and vane assembly 24 and 62, together with the hollow vessel 54, are permitted to move relatively slowly with very little impedance as the pear undergoing peeling varies in diameter.

The advantages of the means for damping rapid oscillation which depends solely upon friction are thus obtained without the accompanying disadvantage of a frictionally-dependent mechanism, i.e. the fact that a drag is present irrespective of the speed at which the knife pivots.

Obviously, many modifications and variations of this invention may be made without departing from the spirit and scope thereof, and therefore only such limitations should be imposed as are indicated in the appended claims.

I claim:

1. In a cutter mechanism for peeling a pear mounted for rotation adjacent said cutter mechanism, the improvements comprising:
   (a) supporting means for said cutter mechanism;
   (b) a shaft having a knife secured thereto;
   (c) means mounting said shaft to said supporting means at the end of said shaft opposite said knife, said means permitting pivotal movement of the said knife radially toward and away from the core of a pear held adjacent said knife as the radius of the pear undergoing peeling varies;
   (d) resilient means urging said knife toward the core of a pear held adjacent said knife; and
   (e) means secured to said supporting means and said shaft damping rapid movement of said knife and said shaft radially but permitting slow radial movement of said shaft and said knife relative to said pear.

2. In a mechanism for peeling a pear mounted for rotation adjacent a cutter mechanism, the improvements comprising:
   (a) a supporting means for said cutter mechanism;
   (b) a shaft having a knife secured to one end thereof;
   (c) means mounting said shaft to said supporting means at the end of said shaft opposite said knife, said means permitting pivotal movement of said knife radially toward and away from the core of a pear held adjacent said knife as the radius of said pear undergoing peeling varies; and
   (d) a dash-pot having two relatively moveable elements, one of said elements being secured to said shaft and one of said elements being secured to said support structure whereby to oppose partially radial movement of the knife whereby free oscillation of the knife relative to the pear caused by any irregularities in the surface of the pear undergoing peeling is damped and reluctance to rapid, free radial movement of the knife is provided.

3. In a mechanism for peeling a pear mounted for rotation adjacent a cutter mechanism, the improvements comprising:
   (a) a support means for said cutter mechanism;
   (b) a shaft pivotally mounted on said support means;
   (c) a knife secured to said shaft at the end thereof remote from the said supporting means;
   (d) a dash-pot having a hollow vessel filled with a viscous fluid, said hollow vessel having a pin pivotally secured therein, said pin extending into the interior of said hollow vessel at one end thereof, said pin having a vane secured at right angles thereto, said vane extending to the interior end of said hollow vessel opposite said pin, said vane being of substantially the same width as the interior of the said hollow vessel, whereby the hollow vessel and the said pin constitute two relatively moveable elements of the dash-pot, one of the said relatively moveable elements being secured to the said shaft and one of the said relatively moveable elements being secured to the said supporting means for said cutter mechanism, whereby to provide means for opposing rapid oscillation of the shaft relative to the said supporting means but permitting slow movement of the said shaft relative to said supporting means.

4. In a cutter mechanism for peeling a pear mounted for rotation adjacent said cutter mechanism, the improvements comprising:
   (a) supporting means for said cutter mechanism;
   (b) a Y-shaped yoke pivotally secured to said supporting means for said cutter mechanism;

(c) a dash-pot having a hollow vessel filled with a viscous fluid, said hollow vessel being secured to said yoke, said hollow vessel having a pin pivotally secured therein, said pin being fixedly secured to said supporting means for said cutter mechanism, said pin extending into the interior of said hollow vessel to a point at one end thereof, said pin having a vane secured at right angles thereto, said vane extending to the interior end of the said hollow vessel opposite said pin, said vane being of substantially the same width as the interior of the said hollow vessel whereby to provide means to oppose rapid oscillation of the said Y-shaped yoke relative to said supporting means for said cutter mechanism but to permit slow movement of said Y-shaped yoke relative to said mounting means for said cutter mechanism;

(d) a shaft secured to said Y-shaped yoke; and (e) a knife mounted on the end of said shaft remote from said Y-shaped yoke.

References Cited in the file of this patent

UNITED STATES PATENTS 3,013,595     Boyce _____ Dec. 19, 1961